Aug. 17, 1926.
A. K. MILLER
1,596,207
STYLUS BAR MOUNTING FOR PHONOGRAPHS
Filed March 9, 1921
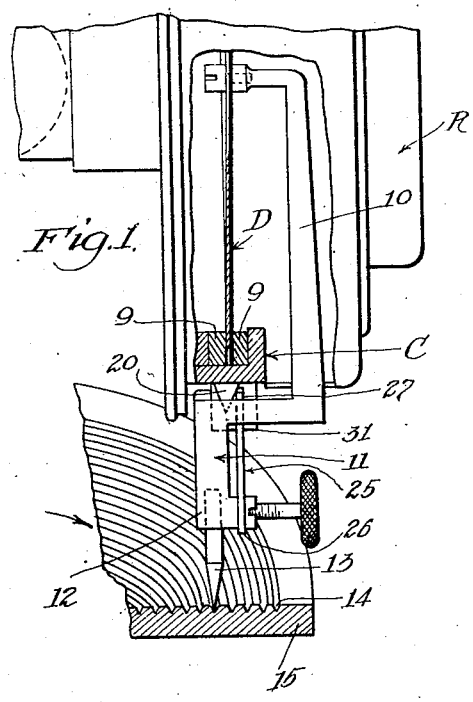
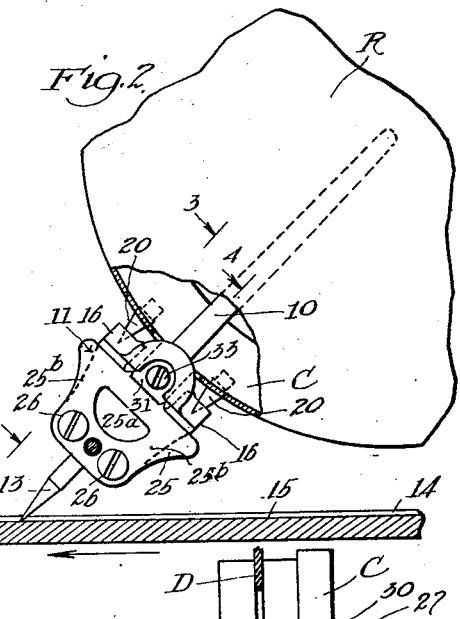
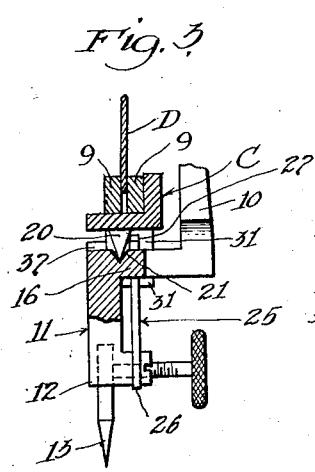
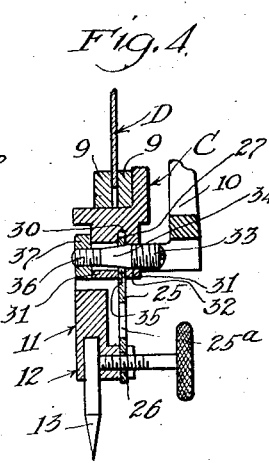
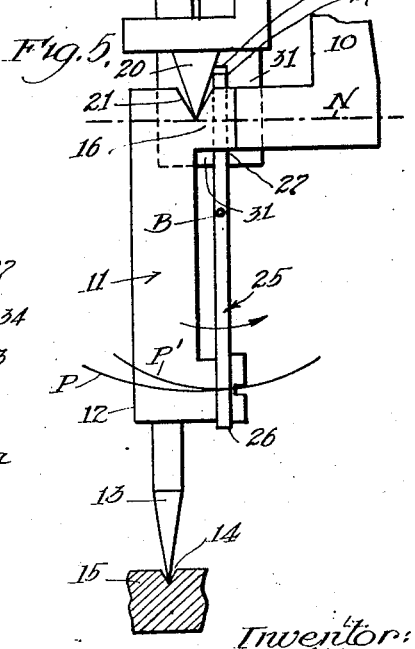
Inventor:
Alfred K. Miller,
By James T. Barkelew
his Attorney Patented Aug. 17, 1926.

1,596,207

UNITED STATES PATENT OFFICE.

ALFRED K. MILLER, OF LOS ANGELES, CALIFORNIA.

STYLUS-BAR MOUNTING FOR PHONOGRAPHS.

Application filed March 9, 1921. Serial No. 450,817.

This invention relates to mounting devices for the needle or stylus of a phonograph and to the devices for transmitting vibration from the needle or stylus to the diaphram, or vice-versa, as the case may be. The invention is capable of general and varied application; and it will be understood that it is only for purposes of illustration and explanation of a preferred and specific form of my invention that I illustrate and describe it in connection with a phonograph reproducer. It may be used in any sound transmitting system where a stylus or similar member is connected to a diaphram or other moving sound generating or transmitting member.

Although the objects of my present invention will be most readily understood from the corresponding features and accomplishments of a specific form of the invention, as explained hereinafter, it may be well at this point to state that among the general objects of the invention are the following: To provide a needle mounting and vibration transmission device which will not introduce into the vibrating system any foreign vibrations, or any appreciable amount of foreign vibrations, due either to characteristic vibrations of the devices themselves, or due to looseness in the moving parts or in their mountings; and to provide a needle mounting and vibration transmitting device which will transmit through to the diaphragm, without impairment or change, the vibrations of the phonograph records. That is, it will be understood that a general object of the invention is to provide such a device as will take up and transmit to the diaphragm, with faithful accuracy, the vibrations present, for instance, in the phonograph record; and will not introduce into those vibrations any objectionable foreign vibrations which should not be there.

My method and means of accomplishing these objects, and other objects and their corresponding accomplishment, will appear throughout the course of the following detailed description and will be best understood from that description; and for the purposes of that description I have illustrated in the accompanying drawings preferred and specific forms embodying the invention, in which drawings—

Fig. 1 is an end elevation, parts being broken away for purposes of illustration, of a phonograph reproducer provided with my improved needle mounting, etc; Fig. 2 is a side elevation thereof with parts in section; Fig. 3 is an end-wise elevation and section on line 3—3 of Fig. 2; Fig. 4 is a section taken on 4—4 of Fig. 2; Fig. 5 is an enlarged diagram showing the parts shown in Figs. 3 and 4.

In the drawings I illustrate at R at reproducer which, in this particular case, happens to be of the general type shown in my application Serial No. 359,725, filed Feb. 18, 1920, for phonograph reproducers. It will be understood, however, that the showing of the present invention in connection with such reproducers is not to be considered a limitation upon the invention. Such a reproducer, as other typical reproducers, has a movable diaphragm D. The diaphragm, in this particular instance, is a flat disk of suitable material, usually mica or similar material, mounted substantially rigidly at its circular periphery, and having a resilient tendency to return to its normal flat configuration if displaced laterally at its center. In this particular case the diaphragm D is mounted at its circular periphery in a rubber mounting ring so that the vibrations of the diaphragm will not be directly transmitted to the reproducer frame C which carries the diaphragm.

A needle arm 10 connects to the diaphragm D substantially at its center, being affixed thereto in any suitable manner, and preferably rigidly attached thereto by any suitable means. The lower end of needle arm 10 is mounted upon the needle bar 11. This needle bar 11 has a needle or stylus socket 12 adapted to hold the needle or stylus 13 which follows the sound grooves 14 in record 15. The stylus bar 11 also includes portions 16 which extend from the bar at its end opposite the needle socket 12 and these portions 16 are pivotally seated or mounted upon a suitable pivot seat. This pivot seat is one upon which the needle bar bears preferably in a direction parallel to, or substantially parallel to, the plane of diaphragm D; and, although other forms of pivot seat may be used, I find it convenient to use a pivot seat of the type illustrated in the drawings, embodying a pair of spaced pivot points 20 which enter cone shaped recesses 21 in the needle bar, the recesses being so formed as to allow pivotal movement of the needle bar on points of the pivot seat. It will be understood that the two spaced pivot points 20 form, in this particular specific form of my device, in reality, a transversely extending pivot line, that pivot line, or, as it might otherwise be expressed, the axis of the transversely extended pivot, being substantially parallel to the normal plane or diaphragm D and being transverse to a line drawn through the needle socket and extending to the center of diaphragm D.

For the purpose of holding the stylus bar upon its pivot seat, and at the same time tensioning the stylus bar and its connected parts, so as to put them under tension and eliminate any loosenesses between the relatively moving parts, and to put the diaphragm under normal tension so that it will not vibrate loosely, I utilize, in this particular form of my invention, a single flat spring 25 rigidly attached at its outer end at 26 to the needle bar and connected at its inner end at 27 to frame C. Spring 25 normally lies in a plane substantially parallel to the plane of diaphragm D, as illustrated in the drawings. The pivot points 20, or the pivot line determined by those points hereinbefore described, may lie substantially in the plane of diaphragm D, as is clearly shown in the drawings; although I find that I may offset this pivotal line from the diaphragm with good results. The attachment of the outer end of spring 25 at the points 26 to the needle bar is rigid. At 27 where the inner end of spring 25 is connected with case C, the arrangement is as shown in detail in Fig. 4. The inner end of spring 25 enters a slot 30 between the two lugs 31. One of these lugs has a transverse screw-threaded bore 32 in which the larger screw-threaded part 33 of a tensioning pin is adapted to screw-threadedly fit. This pin has a tapered portion 34, which passes through an aperture 35 in the inner end of spring 26. The pin also has a reduced portion 36 which passes through the other lug 31, and the lock nut 37 on the outer end of portion 36 provides for locking the pin in any position in which it may be set and also provides for drawing the two lugs 31 together so as to clamp the inner end of spring 25 tightly between them. By screwing the pin inwardly in the screw-threaded bore 32, the cone-shaped portion 34 acts upon spring 25 to draw it inwardly toward the reproducer frame upwardly in Fig. 4. By this means the longitudinal tension on spring 25 may be properly adjusted so as to just hold the needle bar upon its seat with a sufficient amount of pressure to keep it all times firmly on the pivot seat and to provide the tension hereinafter described. The pivot line determined by the two pivots 20 extends on opposite sides of the point of attachment at 27 of spring 25; with the result that when the spring 25 is drawn inwardly by the operation of screw 33, the needle bar 11 is pressed with equal pressure against both the pivot points and it and the needle bar is then held positively against any displacement in or parallel to the plane of spring 25. For the purpose of allowing the needle bar to adjust itself in its bearing upon the bearing points 20 when the spring 25 is drawn inwardly, it will be noted that the spring 25 is free to adjust itself about the screw 33 of the center until, after being adjusted as to longitudinal tension on the spring, the lock nut 37 is set up to then firmly clamp the inner end of the spring.

Now when the inner end of the spring is thus drawn inwardly and then clamped, the longitudinal tension on spring 25 tends to throw the needle bar around in the direction indicated by the arrow in Fig. 5 and of course tends to move the center of the diaphragm D over toward the left in Fig. 1. The diaphragm however is initially flexed in the opposite direction by drawing it to the right in Fig. 1 up against the arm 10 so that it also tends to move toward the left in Fig. 1. This action of the spring 25 is due to the off-set between the spring 25 and the pivot points 20. This action will, of course, cause the spring 25 also to bend slightly toward the right in Fig. 5, in the direction indicated by the arrow in that figure; and if the parts are so made and so related that, when they are assembled, and before the spring 25 is put under longitudinal tension, the spring 25 lies in a plane absolutely parallel to the untensioned diaphragm, then, when spring 25 is longitudinally tensioned, the lower end of spring 25 will, of course, be flexed slightly to the right in Fig. 5. On the other hand, the parts may be so related that, before the spring is put under longitudinal tension, it may lie at its lower end, slightly to the left of a plane parallel to the diaphragm and the tensioning of the spring may then put it back into a plane substantially parallel to the normal plane of the diaphragm. The amount of this action is relatively small, but large enough so that the spring is never, during vibration, without lateral tension. Spring 25 is preferably comparatively wide, but is comparatively narrow at its inner end where it is attached to the frame and wider where it is rigidly attached at 26 to the stylus bar. Its medial part may be formed as shown in the drawings, and in order to lighten its action its center portion, as indicated at $25^a$, may be cut out. The spring may be so made that its bending is more or less concentrated at or about a transverse line located near the point of attachment at 27, the approximate location of this line of greatest bending being indicated by the letter B in Fig. 5. Greater flexibility at this point may be secured either by making the spring thinner at that point or by making its effective width less at that point than at others, or both; or by suitable treatment of the steel or other metal of which the spring is composed. In any case the spring 25 has its resilient action limited substantially to flexure in a direction transverse to its own plane; this limitation being imposed upon it by the mounting of the stylus bar upon the two spaced pivot points 20. Its shape may be such that, as illustrated, its two side portions at 25$^b$ extend somewhat diagonally to the longitudinal central line of the spring so that the lateral flexure of the spring as a whole causes somewhat torsional bending of the two side parts 25$^b$.

Suppose now that in Fig. 5 the spring 25 has been stressed longitudinally and thus forced over to the right in Fig. 5; and that the diaphragm has been initially stressed to the right in Fig. 1. Vibration transmitted to the needle bar 11 from needle 13, of course causes the needle bar to rock slightly (to the extent of the small amplitude of the vibrations) upon the pivot points 20. Due to the offset between the spring and the pivot, longitudinal tension on the spring of course has a constant tendency to throw the needle bar around toward the right in the direction indicated by the arrow in Fig. 5, and to move the diaphragm toward the left in Fig. 1. For any particular amount of tension of spring 25 and initial diaphragm displacement, the parts will assume some position of equilibrium. That position of equilibrium will of course be one in which the resistance of spring 25 to transverse bending is equal to the force exerted by the longitudinal tensioning of the spring and the force exerted by the diaphragm tending to return to normal.

Suppose now that in Figure 5 the circular P represents the path of oscillation of the needle bar 11 in its pivotal movement about the pivot points 20. It, of course, cannot be said that the movement of the free end of spring 25 (if it were unconnected with needle bar 11) would be in a truly circular path; but its path of movement would be represented by a curve, and, in the relation of parts shown in the drawings, this curve would be of shorter radius than the radius of the path P. Accordingly, for purposes of illustration, and assuming a center at the point B where the spring is most flexible, let us, for purpose of explanation, assume that the free path of the lower end of the spring 25 is represented by the circular line P'. From a consideration of these paths of movement it is evident that, when the spring 25 is put under longitudinal tension, vibratory rocking of the needle bar 11 upon its pivots must be accomplished by a slight longitudinal resilient action in the spring and needle bar and other parts; and it is this resiliency of action that enables the needle bar to rock on its pivot point and at the same time keep the needle bar bearing closely on its pivot points, without becoming loose on them. The amount of such resilient action (a resilient action longitudinally of the spring 25) is of course very small because the amount of rocking vibration of the needle bar on its pivot point is very small and because, for this small rocking amplitude, the divergence of the two paths P and P' is very small.

Considering the system as a whole, when spring 25 is put under longitudinal tension, there is a tendency to hold the needle 13 over toward the right, in Figs. 1 and 5. In other words, the stiffness of the needle against movement to the left is greater than the stiffness of the needle against movement toward the right; so that the needle will move with relatively greater freedom toward the right than toward the left. This is caused by the action of spring 25. As hereinbefore stated, the holding of the needle bar over towards the right is due to the longitudinal tensioning of spring 25; and if the needle bar is displaced toward the left, it causes, among other things, a longitudinal expansion of spring 25. Now, due to the relatively high modulus of elasticity of the spring in a longitudinal direction, (this spring is made of hard steel or a similar material), and due also the fact that the two paths P and P' diverge more quickly as movement occurs toward the left, it is readily seen that, upon enforced movement of the lower end of the needle bar toward the left in Fig. 5, the spring action stiffens up very quickly. In other words, the action of spring 25, taken alone, is to oppose comparatively strong movement of the stylus bar and needle toward the left. Diaphragm D also tends to keep the needle toward the right. On the other hand, it is the resistance of spring 25 to lateral flexure that opposes movement toward the right, and this lateral flexure does not increase in stiffness as fast as the longiutdinal tensioning increases in stiffness.

Furthermore, upon movement of the needle toward the right the longitudinal tension of the spring 25 decreases with less rapidity than it increases upon movement of the needle towards the left. (This can be readily understood from a consideration of the relatively large amount of divergence of the paths P and P' toward the left and the relatively small amount of divergency of the paths P and P' toward the right. In fact, if the movement toward the right were far enough a point would be reached where the two lines are practically parallel and at that point there would be no change whatever in the tension of the spring 25). The tension of diaphragm D decreases, while the needle moves toward the right. Consequently, as the needle moves toward the right, the opposing force, although it increases, increases at a rate much smaller than that at which the opposing force increases when the needle moves toward the left. Consequently, the needle may move more freely toward the right than toward the left, from its normal position of rest.

The diaphragm may be, for instance, initially displaced about one-thirty-second to one-sixteenth of an inch from its normal plane; its displacement being sufficient to prevent the sound vibrations carrying it through its normal plane. Thus the diaphragm is kept under tension at all times and at no time vibrates loosely. Also the longitudinal tension on spring 25 and the amount of lateral displacement of that spring from its normal plane (the plane it would assume if unflexed) are such that the spring is never carried by the vibration through its laterally untensioned position or the stylus bar ever relieved from pressure against its pivot seat. Thus the whole system is kept at all times under tension, or pressure, so that no parts can vibrate loosely.

Now for the purposes of the needle vibration, the casing of the reproducer may be considered as substantially stationary. Of course, as in the usual type of disk phonograph, the reproducer and the needle are fed across the face of the record from the outside toward the center of the record, by engagement of the needle in the groove; the reproducer being free to be so fed by the needle. But for all purposes and intents as regards vibration of the needle the mass of the reproducer is large enough so that the reproducer may be considered substantially stationary. Now, the needle being fed by contact with the record groove from the outside to the inner parts of the record, it follows that the needle bears more heavily against the outside groove wall than it does against the inside wall. In other words there is a tendency for the needle to follow the outside wall of the groove rather than the inside wall of the groove; but the sinuous shape of the groove throws the needle back and forth from time to time, between the two walls of the groove; and if the groove and needle are not of such shape as to absolutely fit each other (which is of course an impossibility in actual practice particularly where records or needles are a little worn) then, there is a certain looseness of movement as between the needle and the walls of the groove; and this looseness of movement of course introduces foreign noises into the sounds transmitted and reproduced by the phonograph mechanism. Now the arrangement of my needle mounting is such that the tendency is to keep the needle against the outside wall of the record groove; that is, in consonance with what has been hereinbefore explained, the needle moves freely toward the right and therefore moves more freely toward and into the undulation of the right-hand, the outside, wall of the record groove. In other words, there is a greater tendency of the needle to travel against and engage the outside wall of the record groove than there is for the needle to move in the opposite direction and to be thrown over against the inside wall of the record grooves. It is thus that I eliminate, by the construction herein explained, many of the foreign noises which normally attend phonograph or other sound machines or apparatus.

Considering now the vibrating system which comprises the needle, the needle bar 11, the spring 25, and the needle arm 10 with its load at its upper end, (the resistance of the diaphragm to movement) we have a vibrating system that has a center of inertia or node point. This center of inertia or node point is, in my present design, co-incident or substantially co-incident, with the pivot line of the two center points 20; or if not co-incident or substantially coincident therewith, is located substantially in the same transverse plane therewith (a plane represented by line N in Fig. 5); so that the pivotal mounting of the system is at or near the location of the center of inertia or node point of the system, particularly as regards the longitudinal situation of that center of inertia or node point. And my construction allows this node point to be located at or near the pivot line, also as regards a transverse direction, because as will be noted, the needle bar 11 is located at one side of the longitudinal plane through the pivot line while the needle arm 10 is on the other side. This location of the center of pivotal movement allows the vibrating system to vibrate freely without introducing into the system foreign vibrations and without damping off the record vibrations. It will be very clearly seen that if the pivot center is located at a point in the system that, if unrestrained, will tend to vibrate, foreign vibrations will be introduced and the proper record vibrations will be modified.

I have explained how the spring 25 is offset from the longitudinal plane of the pivot points 20. The exact position of the normal diaphragm plane is not so important, and they may be placed in that plane or slightly offset from it.

In a practical construction in which the above described features are carried into operation, the various parts are of the proportionate size shown in the drawings. Without limiting my invention to the specific proportions shown, but to give an idea of proportionate sizes that accomplish the results, I may say that the drawings show the devices (in Figs. 1, 2, 3 and 4) twice the actual size. Diaphragm D is an ordinary mica diaphragm and the spring 25 is made of spring steel one-thirty-second of an inch in thickness. The offset of pivot points 20 from the plane of spring 25 is about one thirty-second of an inch; and the diaphragm is normally displaced about one-thirty-second to one-sixteenth of an inch.

Having described a preferred form of my invention, I claim:

1. In apparatus of the character described, a diaphragm, a fixed member carrying a pivot, a stylus bar adapted to engage the pivot, a flat resilient member connecting the stylus bar and the fixed member and rigidly affixed to the stylus bar, the resilient member being disposed substantially parallel to the plane of the diaphragm, and means in connection with the resilient member for adjusting the pressure of engagement between the pivot and the stylus bar and for rigidly connecting the resilient member to the fixed member.

2. In apparatus of the character described, a diaphragm, a pivot, a stylus bar adapted to engage the diaphragm and the pivot, and a flat resilient member rigidly connected with the stylus bar to hold it in pressure engagement with the pivot, and to tension the bar as regards movement about the pivot, said member being in a plane substantially parallel to the diaphragm.

3. In apparatus of the character described a frame, a diaphragm therein, a stylus bar connected with the diaphragm, a pivot seat against which the stylus bar rests, and means for holding the bar on its pivot and tensioning the bar embodying a resiliently yielding member connected to the frame and bar and extending between them substantially in the direction in which the bar bears on its pivot seat having its resilient yielding motion in a direction transverse to its said extent and being relatively unyielding in the direction of its said extent.

4. In apparatus of the character described, a frame, a diaphragm therein, a stylus bar connected with the diaphragm, a pivot seat against which the stylus bar rests, and means for holding the bar on its pivot and tensioning the bar embodying a flat yielding member lying in a plane substantially parallel to the diaphragm and connected to the frame and bar and extending between them substantially in the direction in which the bar bears on its pivot seat and having its yielding motion in a direction transverse to the plane of the diaphragm and transverse to the direction in which the bar bears on its pivot seat.

5. In apparatus of the character described, a frame, a diaphragm therein, a stylus bar connected with the diaphragm, a pivot seat member on the frame presenting a pivot seat which faces in a direction substantially parallel to the plane of the diaphragm and on which seat the stylus bar bears in a direction substantially parallel to the plane of the diaphragm, and means to tension the stylus bar and hold it on its seat embodying a flat yielding member lying in a plane substantially parallel to the diaphragm and connected to and extending between the frame and bar in a direction substantially parallel to the diaphragm and having its yielding motion transverse to its plane, and means to tension the flat yielding member in the direction of its said extent.

6. In apparatus of the character described, a frame, a diaphragm therein, a stylus bar connected with the diaphragm, a pivot seat against which the stylus bar rests, and means for holding the bar on its pivot and tensioning the bar against vibration embodying a transversely yielding member longitudinally connected between the frame and the bar and relatively unyielding in a longitudinal direction said member being rigidly connected with the stylus bar, and means for tensioning said member longitudinally and for adjustably rigidly connecting said member with the frame.

7. In apparatus of the character described, a frame, a diaphragm therein, a stylus bar connected with the diaphragm, a pivot seat against which the stylus bar rests, and means for holding the bar on its pivot and tensioning the bar against vibration embodying a transversely yielding member longitudinally connected between the frame and the bar and relatively unyielding in a longitudinal direction, and means for tensioning said member longitudinally; the axis of longitudinal extent of said means being offset from said pivot.

8. In apparatus of the character described, a frame, a diaphragm therein, a stylus bar connected with the diaphragm, a pivot seat member on the frame presenting a pivot seat which faces in a direction substantially parallel to the plane of the diaphragm and on which seat the stylus bar bears in a direction substantially parallel to the plane of the diaphragm, and means to tension the stylus bar and hold it on its seat, embodying a tensioning member connected to and extending between the frame and bar in a direction substantially parallel to the diaphragm plane and offset from said pivot seat; and means for tensioning said tensioning member longitudinally.

9. In apparatus of the character described, a frame, a diaphragm therein, a stylus bar connected with the diaphragm, a pivot seat on the frame against which the stylus bar bears in a direction substantially parallel to the plane of the diaphragm, said pivot seat embodying spaced pivot points spaced in said plane of bearing and spaced transversely of the line drawn through the stylus and the center of the diaphragm; and a single tensioning member connected to the stylus bar and extending to and connected to the frame at a point between said spaced pivot points and lying substantially in a plane parallel to the diaphragm plane.

10. In apparatus of the character described, a frame, a diaphragm therein, a stylus bar connected with the diaphragm, a pivot seat on the frame against which the stylus bar bears in a direction substantially parallel to the plane of the diaphragm, said pivot seat embodying spaced pivot points spaced in said plane of bearing and spaced transversely of the line drawn through the stylus and the center of the diaphragm; and a single tensioning member connected to the stylus bar and extending to and connected to the frame at a point between said spaced pivot points and lying substantially in a plane parallel to the diaphragm plane; the connection of said member to the frame embodying a single point of connection so that the stylus bar may adjust itself to equitable pressure upon the spaced pivot points.

11. In apparatus of the character described, a frame, a diaphragm therein, a stylus bar connected with the diaphragm, a pivot seat on the frame against which the stylus bar bears in a direction substantially parallel to the plane of the diaphragm, said pivot seat embodying spaced pivot points spaced in said plane of bearing and spaced transversely of the line drawn through the stylus and the center of the diaphragm; and a single tensioning member rigidly connected at one end to the stylus bar and extending to and connected to the frame at a point between said spaced pivot points, and the tensioning member lying substantially in a plane parallel to the diaphragm plane and yielding in a direction transverse to its plane; and embodying further a positive clamping means on the frame for that end of said member.

In witness that I claim the foregoing I have hereunto subscribed my name this 28th day of February 1921.

ALFRED K. MILLER.